US008721815B2

(12) United States Patent
Johnson et al.

(10) Patent No.: US 8,721,815 B2
(45) Date of Patent: May 13, 2014

(54) METHODS AND SYSTEMS FOR ASSEMBLY OF FIBERGLASS REINFORCED SUCKER RODS

(75) Inventors: Donald Mike Johnson, The Woodlands, TX (US); Stephen Morris, Katy, TX (US)

(73) Assignee: Centrax International Corp., The Woodlands, TX (US)

( * ) Notice: Subject to any disclaimer, the term of this patent is extended or adjusted under 35 U.S.C. 154(b) by 289 days.

(21) Appl. No.: 13/169,246

(22) Filed: Jun. 27, 2011

(65) Prior Publication Data

US 2012/0031539 A1     Feb. 9, 2012

Related U.S. Application Data

(60) Provisional application No. 61/372,017, filed on Aug. 9, 2010.

(51) Int. Cl.
*B29C 65/82* (2006.01)
*B29C 65/48* (2006.01)

(52) U.S. Cl.
USPC ............. 156/64; 156/153; 156/158; 403/265; 403/267; 403/268

(58) Field of Classification Search
USPC .................. 156/64, 153, 158, 293, 294, 296; 403/265, 267, 268
See application file for complete search history.

(56) References Cited

U.S. PATENT DOCUMENTS

| 1,607,941 | A | 11/1926 | Bowser |
|---|---|---|---|
| 3,168,340 | A | 2/1965 | Howard |
| 3,802,057 | A | 4/1974 | Porter |
| 4,195,691 | A | 4/1980 | Newling |
| 4,205,926 | A | 6/1980 | Carlson |
| 4,360,288 | A | 11/1982 | Rutledge, Jr. et al. |
| 4,430,018 | A | 2/1984 | Fischer |
| 4,469,302 | A | 9/1984 | Stoudt |
| 4,475,839 | A | 10/1984 | Strandberg |
| 4,497,866 | A | 2/1985 | Petterson et al. |
| 4,563,391 | A | 1/1986 | Tanner et al. |
| 4,585,368 | A | 4/1986 | Pagan |
| 4,589,796 | A | 5/1986 | Newling |
| 4,596,486 | A | 6/1986 | Niederer, Sr. |
| 4,597,688 | A | 7/1986 | Pagan |
| 4,653,953 | A | 3/1987 | Anderson et al. |
| 4,662,774 | A | 5/1987 | Morrow, Jr. |
| 4,740,101 | A | 4/1988 | Allen |
| RE32,865 | E | 2/1989 | Rutledge, Jr. et al. |

(Continued)

FOREIGN PATENT DOCUMENTS

WO    2006022652 A1    3/2006
WO    2008108836 A1    9/2008

*Primary Examiner* — George Koch
(74) *Attorney, Agent, or Firm* — Jeffrey L. Wendt

(57) ABSTRACT

Methods for assembling fiberglass reinforced plastic sucker rods include transporting fiberglass reinforced plastic sucker rod sections from an off-site location to an assembly facility at or near a point of use, and transporting a sufficient number of metallic end fittings to connect respective ends of the plurality of sucker rod sections in series at the assembly facility. Systems for assembly of completed sucker rods from sucker rod sections transported from off-site location to or near a point of use. The systems may include a female threaded end component, collar and machine mount that allows completed sucker rods to be pull tested, and record load, peak load, and elongation during the pull test.

15 Claims, 6 Drawing Sheets

(56) References Cited

U.S. PATENT DOCUMENTS

| | | |
|---|---|---|
| 4,830,409 A | 5/1989 | Freeman |
| 4,874,152 A | 10/1989 | Roberts et al. |
| 4,883,930 A | 11/1989 | Martin |
| 4,915,590 A | 4/1990 | Eckland et al. |
| 5,000,611 A | 3/1991 | Reinhart |
| 5,253,946 A | 10/1993 | Watkins |
| 5,412,996 A | 5/1995 | Roberts |
| 5,551,961 A * | 9/1996 | Engen et al. .................... 51/298 |
| 5,762,438 A | 6/1998 | Reed, II |
| 6,186,238 B1 | 2/2001 | Tornquist |
| 6,193,431 B1 | 2/2001 | Rutledge |
| 6,212,763 B1 | 4/2001 | Newman |
| 6,331,223 B1 | 12/2001 | Wylie et al. |
| 6,374,706 B1 | 4/2002 | Newman |
| 6,481,082 B1 | 11/2002 | Widney et al. |
| 6,481,102 B1 | 11/2002 | Hill |
| 6,886,484 B2 | 5/2005 | Thomas |
| 6,942,254 B2 | 9/2005 | Cartensen |
| 7,647,962 B2 | 1/2010 | Ruggeri et al. |
| 7,730,938 B2 | 6/2010 | Rutledge, Sr. |
| 2004/0231127 A1 | 11/2004 | Cartsensen |
| 2008/0127744 A1* | 6/2008 | Myers .............................. 73/826 |
| 2008/0217023 A1 | 9/2008 | Rutledge |
| 2008/0217914 A1* | 9/2008 | Rutledge et al. .............. 285/319 |
| 2008/0219757 A1 | 9/2008 | Rutledge et al. |
| 2010/0239433 A1 | 9/2010 | Rutledge, Sr. |

* cited by examiner

METHODS AND SYSTEMS FOR ASSEMBLY OF FIBERGLASS REINFORCED SUCKER RODS

BACKGROUND INFORMATION

1. Technical Field

The present disclosure relates generally to the field of sucker rods used in conjunction with rod pumps, and more specifically to methods of assembling sucker rod sections and end fittings into completed sucker rods.

2. Background Art

Fiberglass reinforced plastic (FRP) sucker rods and present manufacturing methods are discussed in various public resources, such as U.S. Pat. No. 7,730,938, to Rutledge, Sr. It is assumed the reader is familiar with FRP sucker rods and their use. As will be noted by reviewing the '938 patent, the known manufacturing process involves many steps. Manufacture of the FRP rod sections that make up the final, complete FRP sucker rod relies on a very expensive pultrusion machine and labor-intensive process. It is an object of the present disclosure to perform only certain assembly steps of a completed FRP sucker rod at or near a point of use, such as at or near a producing hydrocarbon basin, thus reducing the need to purchase and operate an expensive rod section pultrusion machine at such points of use, or to transport completed FRP sucker rods long distances to such points of use, with attendant worries of damage to the rods prior to use.

In addition to the above-mentioned problems attendant to the remote manufacture of FRP sucker rods (both jointed and continuous), the present inventor has noted that the known methods of attaching metallic end fittings to abraded fiberglass rod section ends was in need of improvement. In particular, almost no disclosure has been made of particular abrading materials or methods, or of adhesives used in attaching the end fittings to the abraded ends of the FRP rod sections. The '938 patent provides no teaching or details on these issues.

An additional problem faced by the FRP sucker rod assembler, and so far as can be seen in the patent literature, an underappreciated fact, is that the FRP rods stretch during assembly. In one known assembly process, according to the '938 patent, after the adhesive is applied to the end fitting and the end fitting applied to rod end, the end fitting area is heated to cure the adhesive, and then cooled or allowed to cool. As explained in the '938 patent, the cooled rods are then "pull tested" (pulled longitudinally) to set the mechanical wedge bond between the cured adhesive and the end fitting. According to the '938 patent, the pull test both creates and checks the integrity of the mechanical bond between the rod body and the end fitting. What is not discussed is how the pull test is performed (by a hand crank mechanism), or that the rod itself undergoes stretching during the pull test, the degree of stretch depending on the tension force applied, the type of FRP material, diameter of the rod, and so on. In some instances, the present inventor is aware that a nominal 37 foot (11.3 m) length rod may be stretched up to 11 inches (28 cm) or more. Monitoring and measurement of rod stretch is not currently practiced during pull testing, as far as is known, because the hand crank method and apparatus is not set up to measure this. Although the stretch could be measured by hand, it would be beneficial to know the actual rod stretch measurement precisely, since an FRP rod that stretches even a little too much or too little will be compounded over the length of the connected rods down hole. FRP rods that stretch too much may be an indication that they do not have enough longitudinal glass fiber roving, and therefore may not endure many pumping cycles during use; on the other hand, FRP rods that stretch too little may have too much glass fiber roving, and therefore may be too rigid for many down hole applications, or may not be suitable for winding onto to spools.

The industry has long lived with the above-mentioned problems and has accepted them as facts of the business. There is thus a long-felt but as yet unmet need in the art of assembling FRP sucker rods for methods and systems alleviating these problems. Note that while the '938 patent mentions that end fittings may be attached to a sucker rod at a field location, and that several "conventional" steps can be performed, such as "additional quality control checks or inspections", there is no description of or directions given how pull testing and stretch measurement would be accomplished at a field location.

SUMMARY

In accordance with the present disclosure, methods and systems are described that reduce or overcome at least the above-described problems in previously known FRP sucker rod manufacturing.

One aspect of the present disclosure is a method comprising:
- (a) transporting a plurality of fiberglass reinforced plastic sucker rod sections from an off-site location to an assembly facility at or near a point of use;
- (b) transporting a sufficient number of metallic end fittings to connect respective ends of the plurality of sucker rod sections in series at the assembly facility; and
- (c) assembling at the assembly facility at least a portion of the plurality of sucker rod sections with at least some of the metallic end fittings to form a completed sucker rod.

Certain methods of the disclosure include those comprising abrading ends of the sucker rod sections at or near the point of use prior to assembly.

Certain methods disclosed herein comprise the step of pull testing, at the point of use, some or all of the connections between the end fittings and the FRP sucker rod while simultaneously measuring the stretch or change of length of the rod. Certain of these methods may employ computer hardware and software algorithms, and one or more length or stretch measurement sensors to measure the change in length or stretch of the rod during the pull testing. In exemplary methods, all tests are carried out at the point of use.

In certain methods, the abrading comprises using an abrasive article selected from the group consisting of coated, bonded, and nonwoven abrasives. The coated abrasive may comprise a flexible backing upon which an abrasive coating comprising abrasive grains and a binder is attached. The backing may be selected from paper, cloth, film, vulcanized fiber, combinations of two or more of these materials, and treated versions thereof. In certain embodiments, the abrasive article comprises abrasive grains selected from the group consisting of flint, garnet, aluminum oxide, alumina zirconia, ceramic aluminum oxide, diamond, silicon carbide, and mixtures thereof. The abrasive article may comprise a binder selected from group consisting of cured versions of hide glue, varnish, and one or more resins selected from the group consisting of phenolic, urea-formaldehyde, melamine-formaldehyde, urethane, epoxy, and acrylic resins, wherein the phenolic resins include those of the phenol-aldehyde type.

In certain embodiments, "assembling" comprises applying an adhesive to the abraded ends and/or the end fittings at or near the point of use to secure the end fittings to the sucker rod section ends. The adhesive may be pressure-sensitive, heat-sensitive, thermoplastic, elastomeric, thermosetting, thermoplastic elastomeric, reactive, non-reactive, natural, synthetic, and combinations thereof, and the like. Examples may be selected from the group consisting of polyurethanes, polyureas, polyurethane-ureas, epoxies, polyesters, and the like.

In certain methods, the reinforced plastic sucker rod sections and end fittings and adhesive are heated at or near the point of use to a temperature and for a time sufficient to cure the adhesive, and then cooled or allowed to cool.

Another aspect of the disclosure is a method comprising:
(a) transporting a plurality of fiberglass reinforced plastic sucker rod sections from an off-site location to an assembly facility at or near a point of use;
(b) transporting a plurality of metallic end fittings from another off-site location to the assembly facility; and
(c) assembling at the assembly facility at least a portion of the plurality of sucker rod sections with at least some of the metallic end fittings to form a completed sucker rod, wherein the assembling comprises inspecting the completed sucker rods in a pull test, the pull test comprising measuring load and peak load of the completed sucker rods, and elongation of the fiberglass reinforced plastic sucker rod sections.

As with the first aspect, in certain methods ends of the sucker rod sections are abraded at or near the point of use prior to assembly. In certain methods, the abrading comprises using an abrasive article selected from the group consisting of coated, bonded, and nonwoven abrasives. In yet other methods, assembly comprises applying an adhesive to the abraded ends and/or the end fittings at or near the point of use to secure the end fittings to the sucker rod section ends. In yet other methods, the fiberglass reinforced plastic sucker rod sections and end fittings and adhesive are heated at or near the point of use to a temperature and for a time sufficient to cure the adhesive, and cooled or allowed to cool. Certain methods comprise the step of pull testing, at the point of use, some or all of the connections between the end fittings and the FRP sucker rod while simultaneously measuring the stretch or change of length of the rod. Certain of these methods may employ computer hardware and software algorithms, and one or more length or stretch measurement sensors to measure the change in length or stretch of the rod during the pull testing. In exemplary methods, all tests are carried out at the point of use.

Yet another aspect of the disclosure are systems for manufacturing fiberglass reinforced plastic sucker rods, one system comprising:
(a) a station for receiving a plurality of fiberglass reinforced plastic sucker rod sections from an off-site location to an assembly facility at or near a point of use;
(b) a station for receiving a plurality of metallic end fittings from another off-site location to the assembly facility; and
(c) an assembly station for assembling at the assembly facility at least a portion of the plurality of sucker rod sections with at least some of the metallic end fittings to form a completed sucker rod.

In certain systems, the station for assembling comprises an abrading sub-station for abrading ends of the sucker rod sections. In yet other systems, the station for assembling comprises one or more inspection sub-stations for inspecting the sucker rod sections, end fittings, and completed sucker rods. In yet other systems, the station for assembling comprises a sub-station for applying an adhesive to the abraded ends and/or to the end fittings. And in yet other systems, the station for assembling comprises a sub-station for heating the adhesive-laden end fittings and sucker rod section ends. Certain other systems comprise a station for pull testing, at the point of use, some or all of the connections between the end fittings and the FRP sucker rod while simultaneously measuring the stretch or change of length of the rod. In certain systems, existing clamps of a known pull tester are modified to include threads, forming a female threaded component or nubbin which mates with male threads on a pin end of the end fitting. In certain other systems, existing clamps of a known pull tester are removed and replaced with a custom-made nubbin, collar, and machine mount which is engage by the pull tester. In certain systems, one of the inspection sub-stations comprises a pull testing apparatus comprising a nubbin having female threading that threadedly mates with a male threaded end area of the metallic end fittings, the nubbin including a neck area that interacts with a collar and a machine mount, the machine mount securing the nubbin, collar, and metallic end fitting on the pull testing apparatus. Certain of these systems may employ computer hardware and software algorithms, and one or more length or stretch measurement sensors to measure the change in length or stretch of the rod during the pull testing.

As used herein, "inspecting" means, for example, using the conventional human visual inspection technique, using one or more non-visual inspection techniques, and using one or more non-destructive inspection. While some sucker rod sections or competed sucker rods may appear to a human to be acceptable, the sorting into acceptable and rejected sucker rods must also pass objective testing, and not just subjective testing, before the completed sucker rod is approved for use. In certain other methods, inspecting may based on results consisting essentially of results of one or more non-visual, non-destructive inspection steps or sub-methods. As used herein the term "stretch" means elongation, and the terms are used interchangeably herein to refer to the increase in longitudinal length of an FRP sucker rod upon the application of tensile force to a completed sucker rod. "Completed sucker rod" means a rod section having an end fitting attached thereto using an adhesive. The phrases "consist essentially" and "consisting essentially" of results from one or more non-visual, non-destructive inspections means the separation into acceptable and rejected categories is performed chiefly by non-visual, non-destructive inspection, while a certain number of sucker rods may be rejected by human vision review. For example, a sucker rod section may be split, stretched or otherwise so extremely damaged that non-visual, non-destructive inspection is not required to reject it. It will be understood that the non-visual, non-destructive inspection may include one or more steps or types of non-visual, non-destructive inspection.

Methods and systems of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 2:
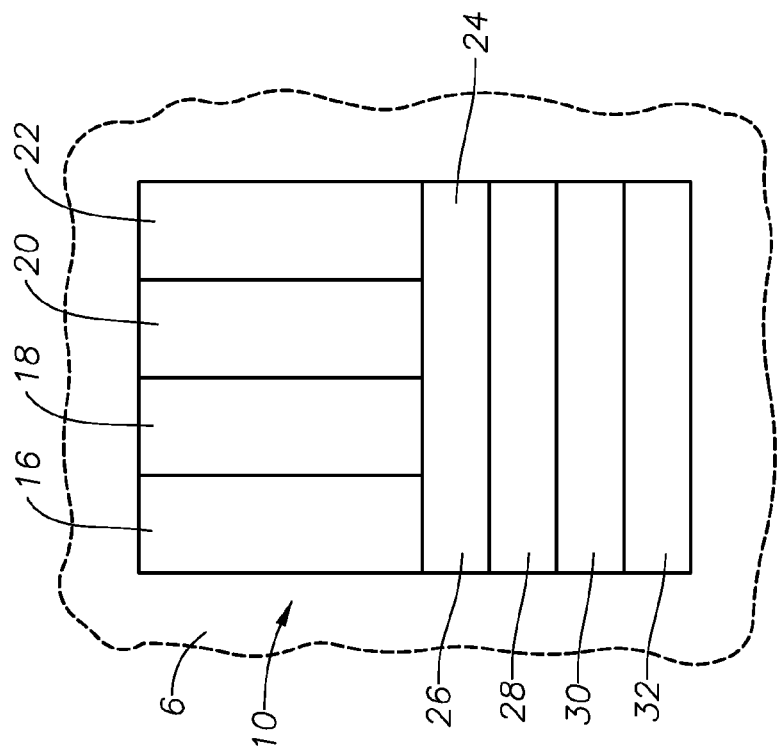
FIG. 2 is a schematic diagram of a system in accordance with the disclosure.

It is to be noted, however, that the appended drawings are not to scale and illustrate only typical embodiments of this disclosure, and are therefore not to be considered limiting of its scope, for the methods, systems and apparatus of this disclosure may admit to other equally effective embodiments. Identical reference numerals are used throughout the several views for like or similar elements.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romantic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The present disclosure is directed toward solving or alleviating a problem in assembling FRP sucker rods. The problem, as explained previously, is that manufacture of FRP rod sections that make up the final, complete FRP sucker rod relies on a very expensive pultrusion machine and labor-intensive process. It is an object of the present disclosure to perform only certain assembly steps of a completed FRP sucker rod at or near a point of use, such as at or near a producing hydrocarbon basin, thus reducing the need to purchase and operate an expensive rod section pultrusion machine at such points of use, or to transport completed FRP sucker rods long distances to such points of use, with attendant worries of damage to the rods prior to use. In addition to the problem attendant to the remote manufacture of FRP sucker rods (both jointed and continuous), the present inventor has noted that the known methods of attaching metallic end fittings to abraded fiberglass rod section ends was in need of improvement. In particular, almost no disclosure has been made of particular abrading materials or methods, or of adhesives used in attaching the end fittings to the abraded ends of the FRP rod sections. The '938 patent provides no teaching or details on these issues. Furthermore, as far as is known to the present inventor, it is not known to measure elongation of the FRP sucker rod section of a completed sucker rod while the completed sucker rod is undergoing a pull test.

Methods and systems of the present disclosure address these problems by assembling FRP sucker rod sections and end fittings at or near a point of use, such as a hydrocarbon production basin, thus avoiding the expense of an expensive pultrusion machine and its operating expenses. The methods and systems of the present disclosure also avoid the necessity of having to transport completed FRP sucker rods to a point of use. Transport of completed FRP sucker rods is expensive, and exposes the completed FRP sucker rods to possibility of being damaged during shipment to a point of use. The methods and systems are explained more fully in the paragraphs that follow. Methods and systems of the present disclosure also address the problem of FRP sucker rod elongation, and knowledge of whether the FRP sucker rod has to much or too little elongation upon the application of tensile force to the completed sucker rod. This knowledge would be extremely helpful to the assembler of completed sucker rods, because knowledge of inadequate or excessive elongation can be fed back to the manufacturers of the FRP sucker rod sections. If the FRP sucker rod section manufacturers can provide more consistent rod sections, then the assembler of completed sucker rods will also benefit from less waste and higher production.

Figure 1:
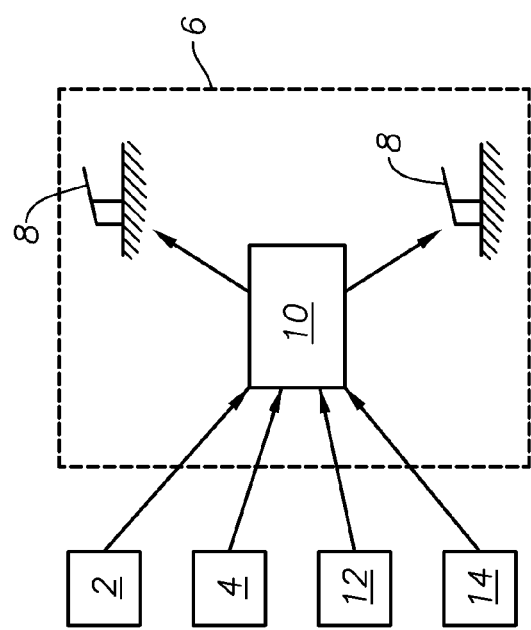
FIG. 1 is a schematic flow chart of a method of the disclosure.

FIG. 1 illustrates schematically one method embodiment in accordance with the present disclosure. Metallic end fittings are transported from an off-site supplier or source 2 to an assembly facility 10 at or near a point of use, such as a basin 6 producing hydrocarbons through use of rod pumps 8. An off-site source 4 of FRP sucker rod sections is provided, as well as an off-site source 12 of adhesive, and an off-site source 14 of abrasive materials. Sucker rod sections, end fittings, adhesives, and abrasive materials are transported from their respective off-site sources to the assembly facility 10 located at or near the point of use on an "as needed" basis.

After the rod sections arrive at assembly facility 10 at or near the point of use, they may have their ends treated (abraded) so as to make them adhere more fully to the adhesive, also supplied from an off-site source. The adhesive may be applied to the end fittings, to the abraded end areas of the FRP sucker rod sections, or to both the end fittings and to the end areas of the sucker rod sections.

FIG. 2 illustrates schematically a system for manufacturing FRP sucker rod sections at or near a point of use in accordance with this disclosure. A hydrocarbon-producing basin 6 serves as the point of use in this embodiment, but this disclosure is not so limited. An assembly facility 10 includes, in this embodiment, a station 16 for receiving FRP sucker rod sections from an off-site source; a station 18 for receiving metallic end fittings for an off-site source; a station 20 for receiving adhesives from an off-site source; and a station 22 for receiving abrasives from an off-site source. Assembly facility 10 further includes an assembly station 24, including, in this embodiment, an abrading sub-station 26; a sub-station 28 for applying adhesive to end fittings and/or end areas of abraded FRP sucker rod sections; a heating sub-station 30 for heating end fittings, at least the abraded end areas of FRP sucker rod sections, and the applied adhesive; and at least one inspection sub-station 32. The various activities that are accomplished at the sub-stations are well-known in the art of assembling FRP sucker rods with metallic end fittings to form completed sucker rods, except for the inventive activities to be described herein regarding the inspection station. One unique and novel feature of the present methods and systems is the combination of receiving stations 16, 18, 20, and 22 within a point of use assembly facility 10 having the sub-stations 26, 28, 30, and 32 (including the new features described herein), in contrast to the conventional process and systems, wherein some or all of these steps, including pultrusion manufacturing of the rod sections, occurs at the point of use, or alternatively all at a remote location, forcing the operator to ship the finished FRP sucker rods to the point of use. As will be recognized, this greatly increases the number of acceptable rods, avoids the purchase and operation of the expensive pultrusion machine at the point of use (which can change over time), and significantly reduces the possibility of a finished FRP sucker rod being damaged in route to the point of use.

Figure 3:
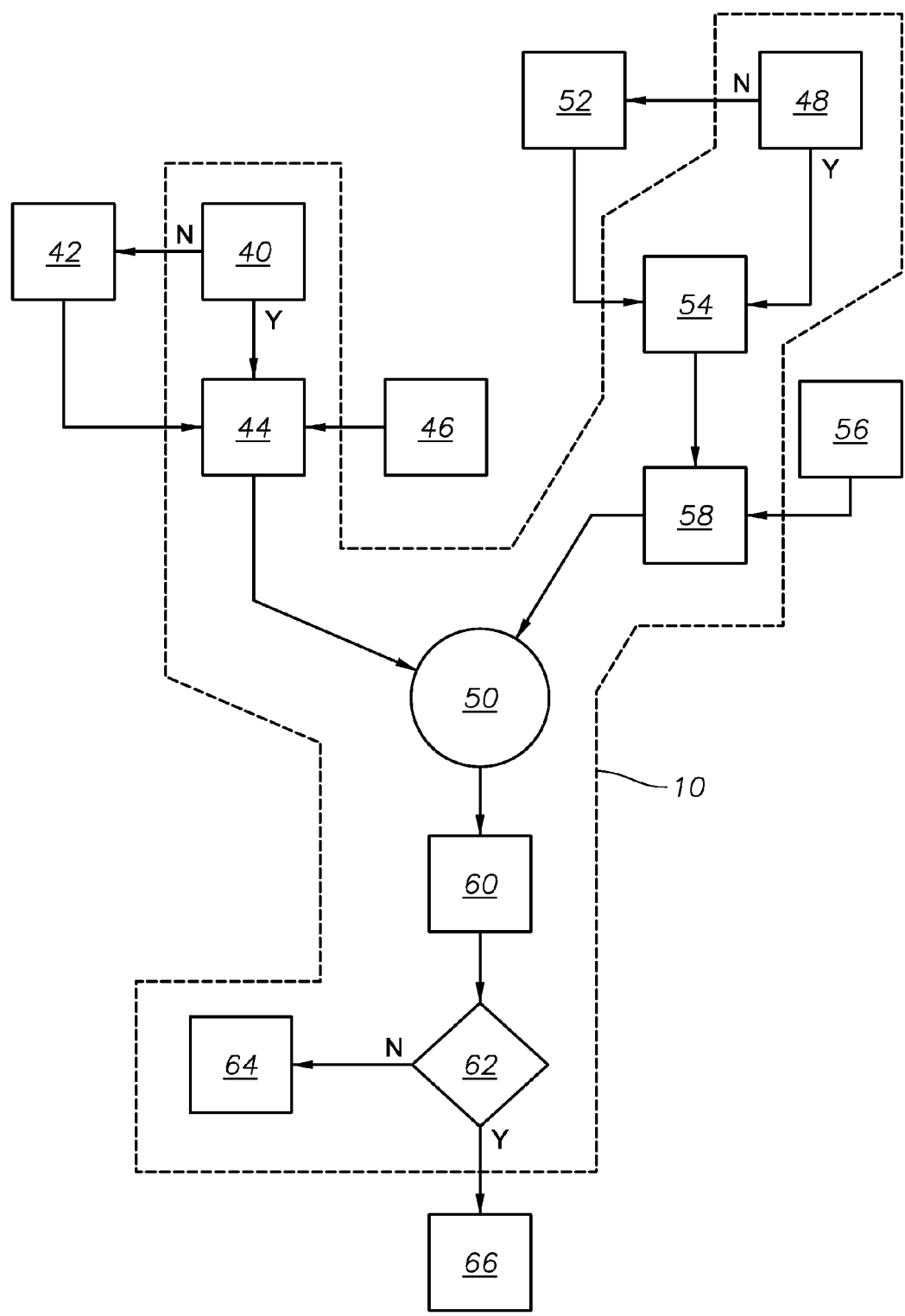
FIG. 3 is a more detailed schematic flow chart illustrating a method of the disclosure.

FIG. 3 is a more detailed schematic flow chart illustrating a method of the disclosure. A point of use assembly facility 10 is depicted schematically by the dotted line. Inside the assembly facility 10 is a station 40 for receiving FRP sucker rod sections and/or asking if they are available on-site. If yes, the available FRP sucker rod sections move to the abrading sub-station 44; if they are not available on-site, they are ordered from an off-site source 42. Abrasives are sourced from an off-site source 46, and are used to abrade the end areas of the FRP sucker rods. The FRP sucker rods having abraded end areas then proceed to an assembly sub-station 50. In parallel, a station 48 for receiving metallic end fittings is located in facility 10, and at this station is asked the question whether there are sufficient end fittings available; if yes, the end fittings move to the pre-treatment station 54; if there are not sufficient end fittings available on-site, they are ordered from an off-site source, as represented by box 52. After treatment at station 54, end fittings may then have adhesive applied thereto at station 58, the adhesive obtained from another off-site source depicted by box 56. (As an alternative, those skilled in the art will realize that adhesive may be applied to the end areas of the FRP sucker rods sections, or to both the end areas and the end fittings.) After the adhesive is applied, the end fittings are moved to station 50 for assembly with the FRP sucker rod sections, followed by a heating station 60, and one or more inspection stations 62. If the completed sucker rods pass inspection, they are transported to the point of use 66. If they are not acceptable, they may be recycled or otherwise disposed of, at station 64.

Methods of the disclosure may be employed by passing sucker rods through one or more stationary inspection stations, or one or more inspection apparatus may be moved along stationary tubulars. Indeed, both the FRP sucker rods and inspection apparatus may move, as long as there is relative movement between them effective to perform the inspection. This pertains to all forms of non-visual, non-destructive inspection. X-ray inspection systems known in the art may be used in methods of the disclosure. FRP (fiber glass reinforced plastics) sucker rod is manufactured in accordance with API 11 C and ASTM specifications. The sucker rod receives strict quality control including X-ray nondestructive test and tensile strength test. The X-ray nondestructive test may be performed for every connection (fully inserting X-ray flaw detector) or some percentage of the connections. An Interlaminar Shear Test may be made at regular intervals, for example, using an Instron-8502 Fatigue Test.

Tensile testing is typically performed using a special purpose tensile tester, such as described in U.S. Pat. No. 4,475,404, or such as described in U.S. Pat. No. 5,412,996 (Roberts) both incorporated herein by reference. In accordance with the present disclosure, a known tensile testing apparatus was modified so that it can test not only tensile strength of the FRP sucker rod sections, and the strength of the adhesive/mechanical connection between end fitting and FRP sucker rod end (commonly referred to as a pull test), but also can measure the elongation of the FRP sucker rod portion of the completed sucker rod during a pull test.

Figure 4:
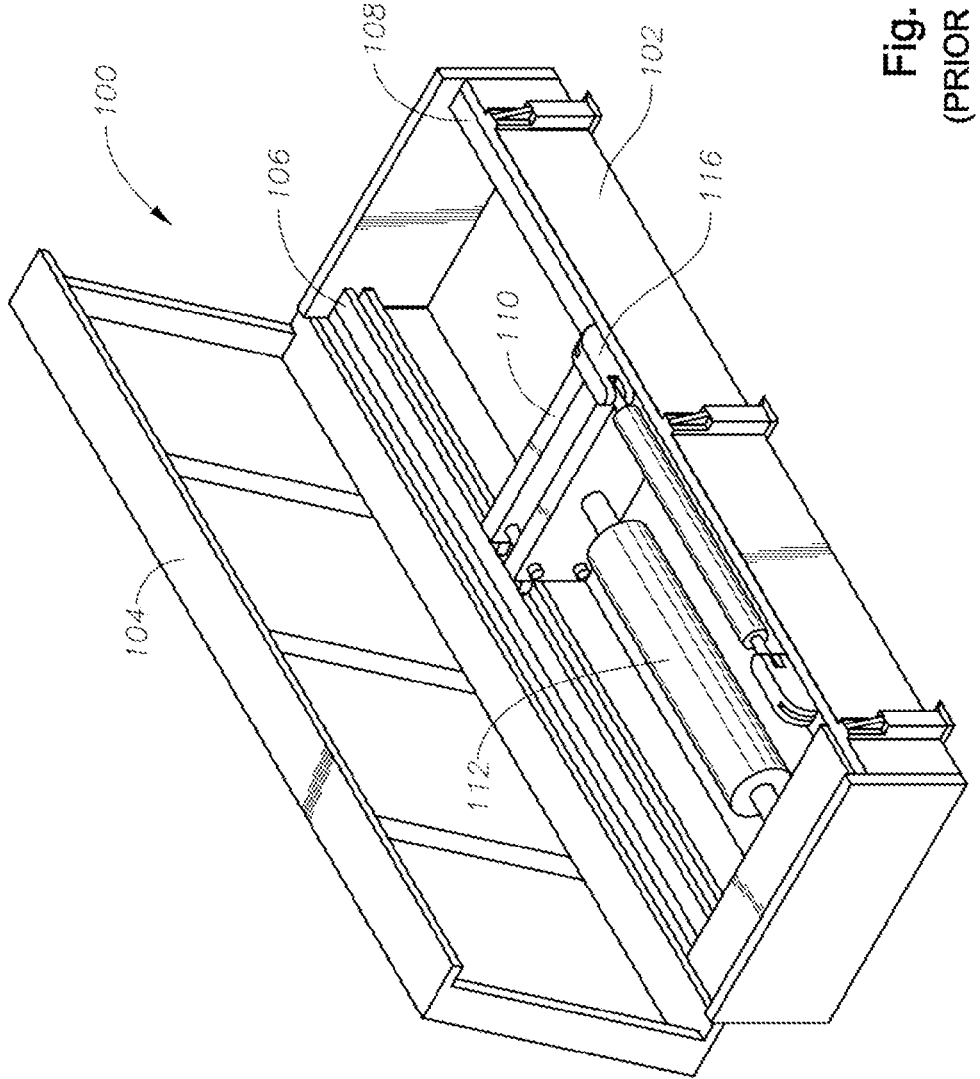
FIGS. 4 and 5 are schematic perspective views of a prior art testing apparatus suitable for use in systems and methods in accordance with the disclosure.
Figure 5:
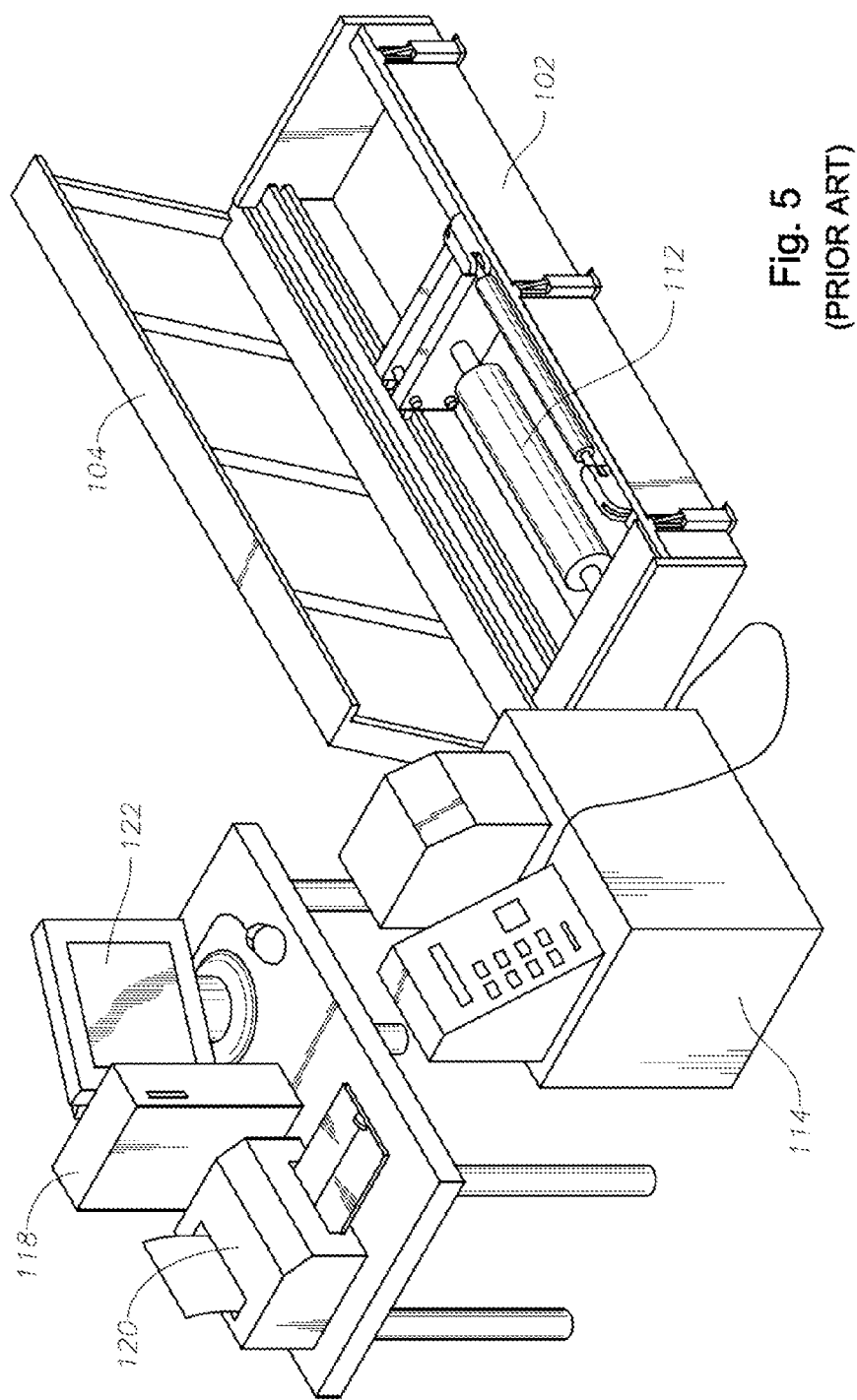

FIGS. 4 and 5 are schematic diagrams of a prior art testing apparatus suitable for use in systems in accordance with the disclosure, and FIG. 6 is schematic perspective view illustrating a female threaded component of the disclosure, that allows use of a testing apparatus such as illustrated schematically in FIGS. 4 and 5 for both pull testing but also stretch testing of completed sucker rod. The following discussion is a summary description of the basic tensile testing apparatus known and described on the AJT Equipment (USA) Inc. (Roberts Testing) Internet web site. AJT Equipment (USA) Inc. (Roberts Testing) is located in Savannah, Ga. (USA). Those skilled in the art will recognize similarities between this apparatus and the disclosed in the '996 patent, the main difference being that the apparatus in the '996 patent includes two hydraulic cylinders rather than one as described here. The methods and apparatus of the present disclosure are not limited to use of one or two hydraulic cylinders. The testing apparatus described here is a modified version of the AJT model known as "150K Horizontal Proof Test Machine/Test Bed", although other models could be used. The embodiment illustrated in FIG. 4, numbered 100, includes a 40-foot (12.19 m) frame 102 with a manually operated safety cover 104. Some embodiments may have hydraulic, pneumatic, or electronic opening safety covers. Manually operated covers may be counter balanced for easier opening and closing. Embodiment 100 includes a pair of side rails 106, 108 upon which traverses a movable carriage 110. Movable carriage 110 allows for testing of different length rods. Carriage 110 is pinned into these positions through holes (not illustrated) in side rails 106, 108. A hydraulic cylinder 112 supplies tension during tensile tests. For easier and faster hook up, hydraulic cylinder 112 is arranged in the pulling mode, although this is not strictly required to practice the methods and systems of the present disclosure. Hydraulic cylinder 112 is built to AJT Testing specifications for rod tensile testing. It is a high-pressure cylinder, and must be compatible with the load cell used. Speed adjustment for the cylinders is a very simple item, but by incorporating it into the power unit, the cylinder is able to retract at the speed desired. A usable hydraulic cylinder may have 48" (1.22 m) stroke, and cylinder speed (approx.) 36"/min (0.91 m/min) which is adjustable.

The load measuring system is an electronic load cell, 116. The electronic strain gauge load cell 116 is an independent measuring system separate from hydraulic power unit, 114 (FIG. 5). Load cell 116 may have a 5 to 1 design factor. Load cell 116 may be calibrated from 1% to 100% of the maximum capacity of the load cell. Load cell 116 will calibrate to ASTM E-4, +/−1% of reading, traceable to the National Institute of Standards and Technology (NIST).

The hydraulic power unit, 114 (FIG. 5) may be, for example, 7.5 hp (5.6 kw), 220/440 v, 26/13 a, 3 PH, 60 Hz. In certain embodiments, Hydraulic power unit 114 may be adjusted in small power increments (for example 1 hp (0.75 kw) or less increments). Being able to control in small increments with a constant, steady flow of hydraulic fluid to the cylinder allows calibration to ASTM E-4, +/−1% of reading, traceable to the National Institute of Standards and Technology (NIST).

Embodiment 100 may be calibrated from 1,500 lbs. to 15,000 lbs. (680.4 g to 6803.9 Kg), or from 15,000 lbs. to 150,000 lbs. (6803.9 Kg to 68,039 Kg).

For repeat testing, a manual loadlock (not illustrated) may be furnished. For testing several times, the operator sets this on the first test piece. The machine will automatically return to this pressure load each time a new piece is placed into the machine.

Embodiment 100 includes computer 118 with Microsoft XP software (desk top or lap top) and printer 120. Other computer systems and software may be substituted, including those running Mac OS (Apple Inc.). "Test 35" certificate software may be included. Roberts Proof Test Certificate software (Test 35) with an analog to digital convertor may now produce PDF files that can be located on a user's website, making them readily available for printing when needed. Embodiment 100 also includes a human-readable screen, 122. Screen 122 has three displays in this embodiment: live load, peak load, and elongation. Live load is the actual load of the completed sucker rod being tested. Peak load is the maximum load to which the completed sucker rod has been subjected. In certain embodiments, a separate peak/hold system automatically resets to the desired test load. With the automatic system, the peak of the last test is not lost. Another feature on certain embodiments is a load limit control feature in the Test 35 software that makes it possible to control the force being applied and the amount of time the proof test will be held at that level of force. The machine will automatically return to this load each time a new completed sucker rod is placed into the machine. This feature is very useful for repeat tests of similar completed sucker rod and for holding a proof test for long periods of time. The third display, elongation of the completed sucker rod, is discussed herein below.

During a tensile or load test for completed sucker rod for verifying the proof load of a completed sucker rod, load cell 116 is used to measure the force during the operation of the test system. Load cell 116 may be a multi-range load cell. When it is desired to test a completed sucker rod, opposite ends of the completed sucker rod to be tested are secured to an apparatus such as substantially detailed in FIGS. 4 and 5, embodiment 100 except that embodiment 100 of FIGS. 4 and 5 will be modified to measure not only live load and peak load, but also the elongation/stretch of the completed sucker rod. An option for the known testing machine available from AJT Testing (USA) Inc. (Roberts Testing) for testing cables and the like is a length measuring system, which may be used to measure the stretch of a cable while under load. According to the supplier, this is similar to, but not quite the same as, an elongation measurement. The length measuring system measures the stretch of the full length of the cable or wire rope while under a specific load, to calculate headroom when making a lift. This includes a length transducer, necessary mounting, and electronic logic to sum total length. A digital display of the length of the sling may be seen on the computer screen. For testing cable wire rope, and the like, a cable gripping block constructed in accordance with U.S. Pat. No. 4,874,152, incorporated herein by reference, is typically employed.

Figure 6A:
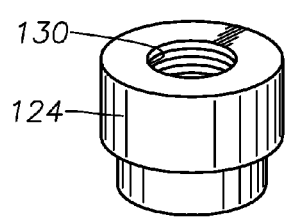
FIG. 6 is a schematic exploded perspective view of a female threaded component and a portion of an end fitting useful in using the apparatus illustrated schematically in FIGS. 4 and 5.
Figure 6B:
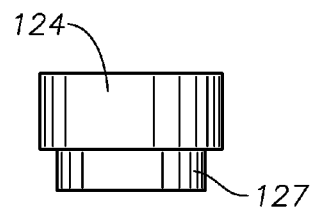
Figure 6C:
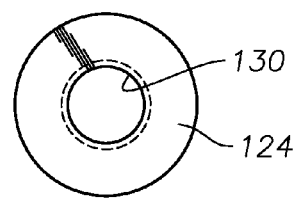
Figure 6D:
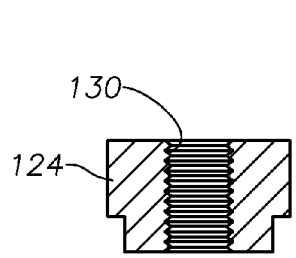
Figure 6E:
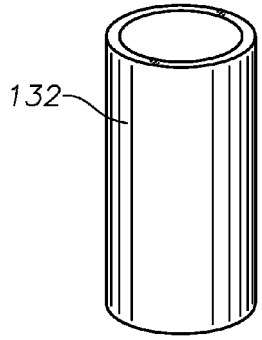
Figure 6F:
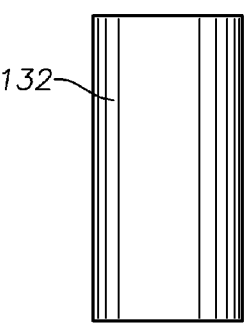
Figure 6G:
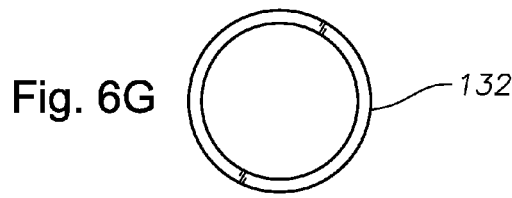
Figure 6H:
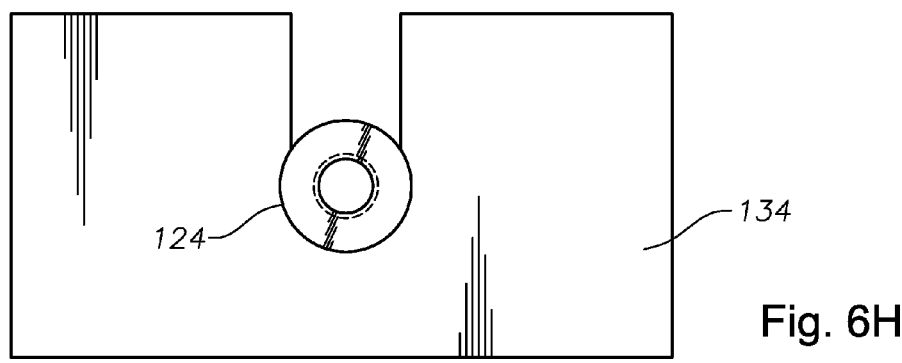

Whereas the known apparatus and methods use gripping blocks, such as described in the '152 patent, certain methods and systems of the present disclosure will use a female threaded component or "nubbin", 124, having internal threads 130 and a neck 127, as illustrated in schematic perspective view in FIG. 6A, side elevation view in FIG. 6B, plan view in FIG. 6C, and cross-section view FIG. 6D, that threadedly mates with a male threading 128 on an end fitting 126 of a completed sucker rod. Nubbin 124 works with a collar 132 (FIGS. 6E, F and G) and machine mount 134 (FIG. 6G) in this embodiment, allowing a completed sucker rod to be mounted in the apparatus such as substantially illustrated in FIGS. 4, 5, and 6H and 6I, and allow the machine to pull test and test elongation of completed sucker rod. Nubbin 124, collar 132 and steel plate machine mount 134 may be of any design, as long as they allow nubbin 124, collar 132, end fitting 126, and machine mount 134 to fit into a movable carriage 110 of an existing testing apparatus such as illustrated in FIGS. 4, 5 and 6I.

Figure 6I:
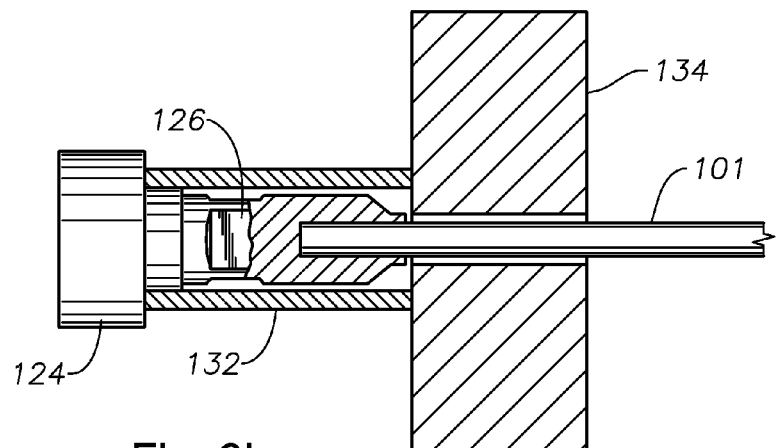
Figure 6J:
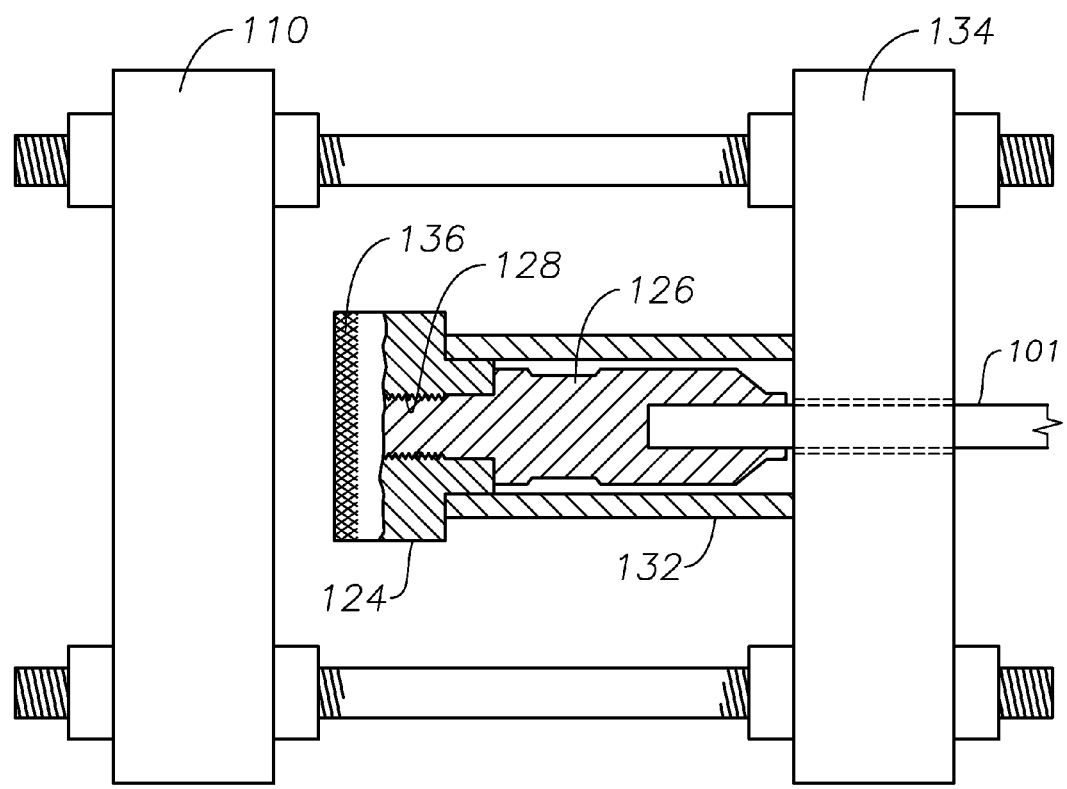

In certain embodiments, such as that illustrated in FIG. 6I, the female threaded component or nubbin 124 may have a rounded and knurled back end 136 so as to allow a worker or machine to more easily rotate threads 130 onto the male threads 128 of end fitting 126. In this embodiment, each end of the completed sucker rod has an end fitting attached thereto, and therefore each end fitting 126 will have a nubbin 124 threaded thereon.

Moreover, it should be noted that each size (diameter) of sucker rod requires a different size nubbin 124, due to the size difference. Threads 128 and 130 are API sucker rod threads in each case.

In accordance with methods of the present disclosure, one method embodiment comprises a single pull comprising multiple (for example, two or three or more) quick sub-pulls in the direction of the arrow illustrated in FIG. 6I. The first pull will be for a time sufficient to achieve predetermined tension. Once it reaches that point the machine release the tension and then tensions the rod again, and then again for a total of five times in this embodiment. The computer controls the tensioning and release of tension. The computer records and displays a plot of the amount of tension/force applied, and in certain embodiments on the same display it plots the amount of stretch that occurred by the amount of pull from 0 to maximum tension force. This series of three quick sub-pulls (other embodiments will use more or less will than three sub-pulls) have the effect of setting the wedges (in the ID of the end fitting into the adhesive), and additionally will comprise a destructive test, whereby if the completed sucker rod breaks it is obviously a "bad" result, and if it does not break it is deemed a "good" result. In addition to plotting load and peak load for example using an "X-Y" recorder for producing stress/strain curves and similar instrumentation, as described in the '996 patent, the elongation/stretch will also be plotted during the pull test.

The addition of nubbin 124, collar 132 and machine mount 134 provides the ability to plot the elongation/stretch of completed sucker rod during a normal and customary pull test, and provide a non-destructive test, the combination of which is unique. It is contemplated that if completed sucker rod has less glass or resin in the FRP portion, it will have more stretch than normally expected, and if there is more glass than expected, it is contemplated that the FRP portion exhibits less stretch. Those of skill in the art on a case-by-case basis will easily determine acceptance/rejection criteria after testing of a small sample size of completed sucker rod.

Systems and methods in accordance with the present disclosure may employ other conventional components, for example, an analog to digital convertor that displays the force in pounds. The analog to digital convertor may be attached to one of the computer's standard serial ports. For example, the monitoring portion of the system described above uses Microsoft XP software and Roberts Proof Test Certificate software for load data acquisition, display, and the printing of a test certificate, and these may be features of the present systems and methods. During a pull test, certain systems and methods in accordance with the present disclosure may continually monitor the load, stretch of the FRP section of the completed sucker rod, capture the peak load, capture the total stretch, and display the data in digital form. Once a test has been completed, the operator can easily print a test certificate containing all pertinent data plots, such as load vs. time, peak load, and elongation vs. time.

As described in the '996 patent, test apparatus embodiments such as embodiment 100 modified by features of the present disclosure may be located at an appropriate test site, which in accordance with the present disclosure may be at or near a point of use, such as a hydrocarbon-producing basin, and is supported upon and atop an appropriately reinforced foundation. In certain embodiments, the foundation may be truck-mounted.

The methods and systems of the present disclosure allow continued use of components that are familiar to FRP sucker rod users, while solving long recognized needs in the art that were heretofore largely ignored and simply lived with.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A method comprising:
   (a) transporting a plurality of fiberglass reinforced plastic sucker rod sections from an off-site location to an assembly facility at or near a point of use;
   (b) transporting a sufficient number of metallic end fittings to connect respective ends of the plurality of sucker rod sections in series at the assembly facility; and
   (c) assembling at the assembly facility at least a portion of the plurality of sucker rod sections with at least some of the metallic end fittings to form a completed sucker rod, opposite ends of the completed sucker rod having one of the metallic end fittings secured thereto;
   (d) securing the metallic end fittings of the opposite ends of the completed sucker rod to a modified pull test apparatus, wherein the modified pull test apparatus comprises:
      a frame having a safety cover, the frame comprising a pair of side rails upon which traverses a movable carriage, the movable carriage adapted to be pinned into variable positions in the side rails; and
      a female threaded component having internal threads and a neck, the female threads mating with male threading on one of the end fittings of the completed sucker rod, the female threaded component configured to work with a collar and a machine mount, allowing the completed sucker rod to be mounted in the apparatus;
   (e) fitting the female threaded component, collar, and machine mount into the movable carriage;
   (f) performing a modified pull test and testing elongation of the completed sucker rod;
   (g) measuring live load, peak load and elongation of the completed sucker rod during the pull test using the modified pull test apparatus, and
   (h) plotting elongation of the completed sucker rod during the modified pull test.

2. The method according to claim 1 comprising abrading ends of the sucker rod sections at or near the point of use prior to assembly.

3. The method according to claim 2 wherein said abrading comprises using an abrasive article selected from the group consisting of coated, bonded, and nonwoven abrasives.

4. The method according to claim 3 wherein the coated abrasive comprises a flexible backing upon which an abrasive coating comprising abrasive grains and a binder is attached.

5. The method according to claim 4 wherein the backing is selected from paper, cloth, film, vulcanized fiber, combinations of two or more of these materials, and treated versions thereof.

6. The method according to claim 3 wherein the abrasive article comprises abrasive grains selected from the group consisting of flint, garnet, aluminum oxide, alumina zirconia, ceramic aluminum oxide, diamond, silicon carbide, and mixtures thereof.

7. The method according to claim 3 wherein the abrasive article comprises a binder selected from group consisting of cured versions of hide glue, varnish, and one or more resins selected from the group consisting of phenolic, urea-formaldehyde, melamine-formaldehyde, urethane, epoxy, and acrylic resins, wherein the phenolic resins include those of the phenol-aldehyde type.

8. The method according to claim 2 wherein assembly comprises applying an adhesive to the abraded ends and/or the end fittings at or near the point of use to secure the end fittings to the sucker rod section ends.

9. The method according to claim 8 wherein the adhesive is selected from the group consisting of pressure-sensitive, heat-sensitive, thermoplastic, elastomeric, thermosetting, thermoplastic elastomeric, reactive, non-reactive, natural, synthetic, and combinations thereof.

10. The method of claim 8 comprising heating the fiberglass reinforced plastic sucker rod sections and end fittings and adhesive at or near the point of use to a temperature and for a time sufficient to cure the adhesive.

11. A method comprising:
    (a) transporting a plurality of fiberglass reinforced plastic sucker rod sections from an off-site location to an assembly facility at or near a point of use;
    (b) transporting a plurality of metallic end fittings from another off-site location to the assembly facility;
    (c) assembling at the assembly facility at least a portion of the plurality of sucker rod sections with at least some of the metallic end fittings to form a completed sucker rod, wherein the assembling comprises inspecting the completed sucker rods in a pull test, the pull test comprising measuring load and peak load of the completed sucker rods, and elongation of the fiberglass reinforced plastic sucker rod sections;
    (d) securing the metallic end fittings of the opposite ends of the completed sucker rod to a modified pull test apparatus, wherein the modified pull test apparatus comprises:
       a frame having a safety cover, the frame comprising a pair of side rails upon which traverses a movable carriage, the movable carriage adapted to be pinned into variable positions in the side rails; and
       a nubbin having internal threads and a neck, the internal threads mating with male threading on an end fitting of the completed sucker rod, the nubbin configured to work with a collar and a machine mount, allowing completed sucker rod to be mounted in the apparatus and allow the apparatus to pull test and test elongation of completed sucker rod, wherein the nubbin, collar, and machine mount are configured to fit into the movable carriage;
    (e) measuring live load, peak load and elongation of the completed sucker rods during a pull test using the modified pull test apparatus, and
    (f) plotting elongation of the completed sucker rod during the pull test.

12. The method according to claim 11 comprising abrading ends of the sucker rod sections at or near the point of use prior to assembly.

13. The method according to claim 12 wherein said abrading comprises using an abrasive article selected from the group consisting of coated, bonded, and nonwoven abrasives.

14. The method according to claim 11 wherein assembly comprises applying an adhesive to the abraded ends and/or the end fittings at or near the point of use to secure the end fittings to the sucker rod section ends.

15. The method of claim 14 comprising heating the fiberglass reinforced plastic sucker rod sections and end fittings and adhesive at or near the point of use to a temperature and for a time sufficient to cure the adhesive.

\* \* \* \* \*